United States Patent
Moriya

(10) Patent No.: US 11,912,607 B2
(45) Date of Patent: Feb. 27, 2024

(54) RAW MATERIAL SUPPLY DEVICE FOR PRODUCTION OF GLASS FINE PARTICLE DEPOSITS AND RAW MATERIAL SUPPLY METHOD

(71) Applicant: SUMITOMO ELECTRIC INDUSTRIES, LTD., Osaka (JP)

(72) Inventor: Tomomi Moriya, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 310 days.

(21) Appl. No.: 17/297,124

(22) PCT Filed: Dec. 4, 2019

(86) PCT No.: PCT/JP2019/047456
§ 371 (c)(1),
(2) Date: May 26, 2021

(87) PCT Pub. No.: WO2020/116522
PCT Pub. Date: Jun. 11, 2020

(65) Prior Publication Data
US 2022/0024801 A1 Jan. 27, 2022

(30) Foreign Application Priority Data
Dec. 4, 2018 (JP) .................... 2018-227116

(51) Int. Cl.
C03B 37/014 (2006.01)
C03B 20/00 (2006.01)
C03B 37/085 (2006.01)

(52) U.S. Cl.
CPC ........ C03B 37/01413 (2013.01); C03B 20/00 (2013.01); C03B 37/085 (2013.01)

(58) Field of Classification Search
CPC .................... C03B 37/01413; C03B 37/085
See application file for complete search history.

(56) References Cited

U.S. PATENT DOCUMENTS

| 2015/0166399 A1 | 6/2015 | Ishihara et al. |
| 2019/0092677 A1 | 3/2019 | Oozeki |
| 2021/0292222 A1* | 9/2021 | Noda ............ C03C 1/026 |

FOREIGN PATENT DOCUMENTS

| JP | S63-040739 A | 2/1988 |
| JP | H04-325410 A | 11/1992 |

(Continued)

*Primary Examiner* — Lisa L Herring
(74) *Attorney, Agent, or Firm* — Faegre Drinker Biddle & Reath LLP

(57) ABSTRACT

This raw material supply device supplies a raw material for producing glass fine particle deposits, to a burner and includes a raw material tank; a liquid raw material pipe having one end thereof connected to the raw material tank; a liquid raw material pressure feed pump that pumps siloxane, being a liquid raw material, from the raw material tank via the liquid raw material pipe; a pressure adjustment valve provided on a secondary side of the liquid raw material pressure feed pump in the liquid raw material pipe; an MFC for liquid, connected to the other end of the liquid raw material pipe; and an aeration device that is connected to the secondary side of the MFC for liquid and aerates the liquid raw material. The pipe on the secondary side of the pressure adjustment valve is connected to a location having lower pressure than the primary side pressure.

3 Claims, 1 Drawing Sheet

(56) References Cited

FOREIGN PATENT DOCUMENTS

| | | |
|---|---|---|
| JP | H06-092668 A | 4/1994 |
| JP | 3077106 B | 8/2000 |
| JP | 2006-327916 A | 12/2006 |
| JP | 2015-113259 A | 6/2015 |
| WO | WO-2017-187915 A1 | 11/2017 |

* cited by examiner

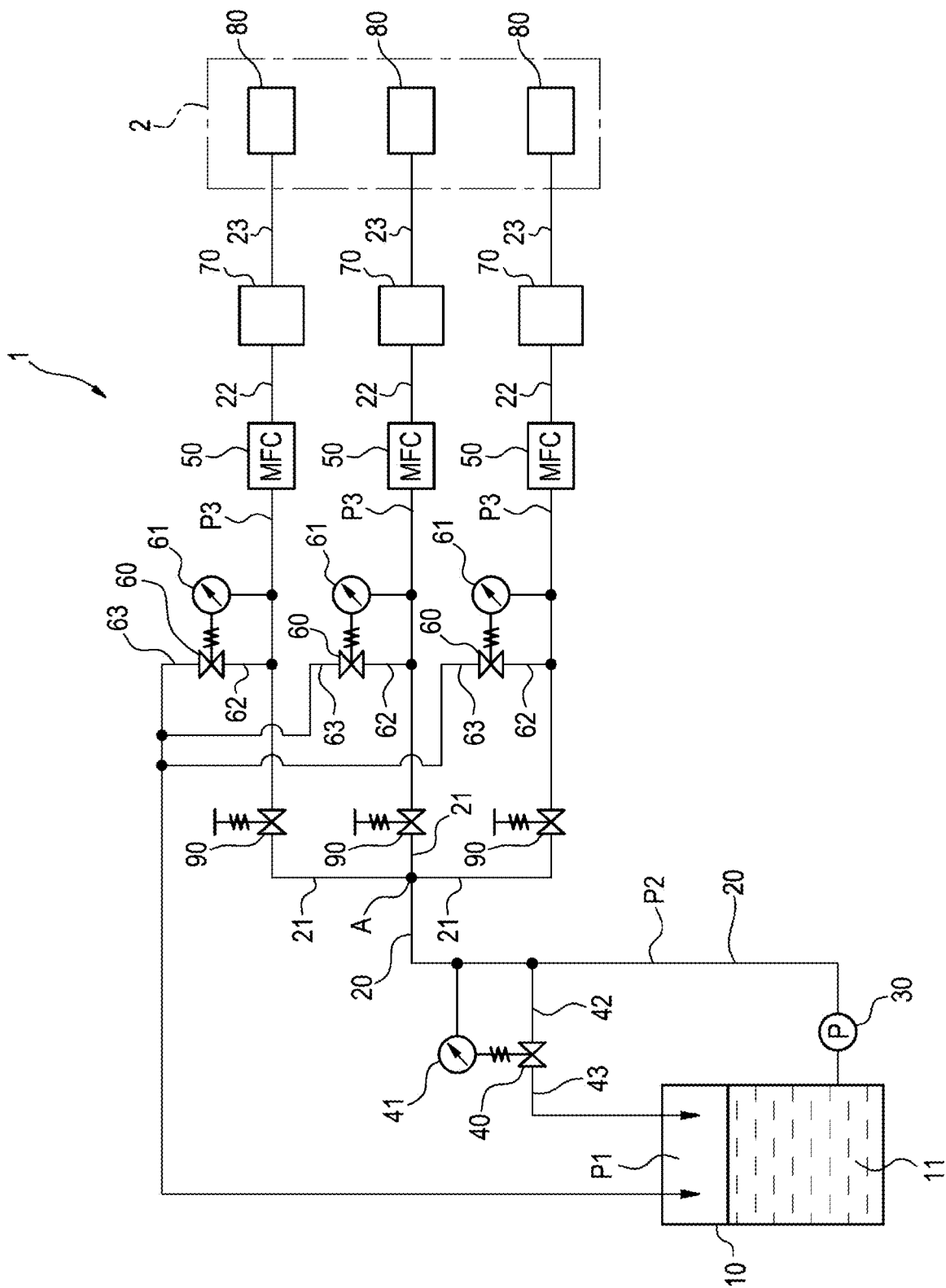

RAW MATERIAL SUPPLY DEVICE FOR PRODUCTION OF GLASS FINE PARTICLE DEPOSITS AND RAW MATERIAL SUPPLY METHOD

TECHNICAL FIELD

The present disclosure relates to a raw material supply device for manufacturing a glass fine particle deposited body and a raw material supply method.

This application is based upon and claims the benefit of priority from Japanese Patent Application No. 2018-227116, filed on Dec. 4, 2018, the entire contents of which are incorporated herein by reference.

BACKGROUND ART

Patent Literature 1 describes a method for manufacturing a glass fine particle deposited body in which siloxane is used as a glass raw material to be supplied to a burner.

Patent Literature 2 describes a method for manufacturing quartz glass in which siloxane is used as a raw material.

CITATION LIST

Patent Literature

Patent Literature 1: JP-A-2015-113259
Patent Literature 2: JP-A-2006-327916

SUMMARY OF INVENTION

A raw material supply device for manufacturing a glass fine particle deposited body according to one aspect of the present disclosure is a raw material supply device that supplies a raw material for manufacturing the glass particle deposited body to a burner, the device including:
  a liquid raw material tank;
  a liquid raw material pipe whose one end is connected to the liquid raw material tank;
  a liquid raw material pressure feed pump that pressure-feeds a liquid raw material from the liquid raw material tank to a liquid MFC via the liquid raw material pipe;
  a pressure adjustment valve that is provided on a secondary side of the liquid raw material pressure feed pump in the liquid raw material pipe;
  the liquid MFC that is provided on the secondary side of the liquid raw material pressure feed pump, and connected to the other end of the liquid raw material pipe; and
  a vaporizer that is connected to a secondary side of the liquid MFC, and vaporizes the liquid raw material, where
  the liquid raw material is siloxane, and
  a pipe on a secondary side of the pressure adjustment valve is connected to a location whose pressure is lower than pressure on a primary side thereof.

A raw material supply method according to one aspect of the present disclosure is a raw material supply method that supplies a raw material to a burner when manufacturing a glass fine particle deposited body, the method including:
  pressure-feeding a liquid raw material to a liquid MFC by a liquid raw material pressure feed pump via a liquid raw material pipe whose one end is connected to a liquid raw material tank in which the liquid raw material formed of liquid siloxane is stored;
  providing a pressure adjustment valve on a secondary side of the liquid raw material pressure feed pump in the liquid raw material pipe;
  connecting a secondary side pipe of the pressure adjustment valve to a location whose pressure is lower than pressure of a primary side thereof.
  adjusting primary pressure of the liquid MFC by the liquid raw material pressure feed pump and the pressure adjustment valve; and
  vaporizing the liquid raw material on a secondary side of the liquid MFC and supplying the vaporized liquid raw material to the burner.

BRIEF DESCRIPTION OF DRAWINGS

FIGURE is a schematic configuration diagram of a raw material supply device according to an embodiment of the present disclosure.

DESCRIPTION OF EMBODIMENTS

Technical Problem

In a raw material supply device that supplies a raw material for manufacturing a glass fine particle deposited body to a burner, when siloxane is used as the raw material, a boiling point of siloxane is high (for example, a boiling point of octamethylcyclotetrasiloxane (OMCTS), which is one of the siloxanes, is 175° C.), such that it is difficult to control a flow rate by using a gas mass flow controller (MFC) after performing vaporization. Since siloxane is a dangerous substance, it is difficult to pressure-feed liquid siloxane by applying high primary pressure to a raw material tank. As one of the methods to solve the above-described problem, there is a method in which siloxane in a liquid state is sent to a liquid MFC by using a pump, and a flow rate thereof is controlled.

However, it is found out that when using the pump, primary pressure of the liquid MFC fluctuates due to pulsation (pressure fluctuation) caused by the pump, and the flow rate of the liquid siloxane flowing through the liquid MFC also fluctuates. Due to the fluctuation of the flow rate thereof, when the liquid siloxane is vaporized and glass raw material gas is supplied to the burner, a flow rate of the gas fluctuates. Thereby, a characteristic of a glass fine particle deposited in a device for manufacturing the glass fine particle deposited body may fluctuate.

An object of the present disclosure is to provide a raw material supply device for manufacturing a glass fine particle deposited body and a raw material supply method in which fluctuation in a characteristic of a glass fine particle deposited on the glass fine particle deposited body can be reduced.

Advantageous Effects of the Present Disclosure

According to a raw material supply device for manufacturing a glass fine particle deposited body and a raw material supply method according to the present disclosure, fluctuation in a characteristic of a glass fine particle deposited on the glass fine particle deposited body can be reduced.

Description of Embodiments of the Present Disclosure

First, embodiments of the present disclosure will be listed and described.

(1) A raw material supply device for manufacturing a glass fine particle deposited body according to one aspect of the present disclosure is a raw material supply device that supplies a raw material for manufacturing the glass particle deposited body to a burner, the device including:

a liquid raw material tank;

a liquid raw material pipe whose one end is connected to the liquid raw material tank;

a liquid raw material pressure feed pump that pressure-feeds a liquid raw material from the liquid raw material tank to a liquid MFC via the liquid raw material pipe;

a pressure adjustment valve that is provided on a secondary side of the liquid raw material pressure feed pump in the liquid raw material pipe;

the liquid MFC that is provided on the secondary side of the liquid raw material pressure feed pump, and connected to the other end of the liquid raw material pipe; and a vaporizer that is connected to a secondary side of the liquid MFC, and vaporizes the liquid raw material, where the liquid raw material is siloxane, and a pipe on a secondary side of the pressure adjustment valve is connected to a location whose pressure is lower than pressure on a primary side thereof.

Since an opening degree of the pressure adjustment valve is adjusted according to a change in pressure on a high pressure side (the primary side), pressure fluctuation on the high pressure side (the primary side) is flattened. As a result, pulsation (the pressure fluctuation) of the liquid raw material by the liquid raw material pressure feed pump can be reduced. Therefore, fluctuation in the pressure on the primary side of the liquid MFC is reduced, and fluctuation in a flow rate of the liquid raw material flowing through the liquid MFC is reduced. Therefore, since fluctuation in a flow rate of gas sprayed from the burner is reduced, fluctuation in a characteristic of the glass fine particle deposited on the glass fine particle deposited body can be reduced.

Since bubbles of dissolved gas generated by the liquid raw material pressure feed pump or the like flows from the high pressure side of the pressure adjustment valve to the low pressure side (a side of a secondary side pipe) thereof, the dissolved gas can be removed from the liquid raw material supplied to the liquid MFC. The dissolved gas is removed, thereby making it possible to reduce the fluctuation in the flow rate of the liquid raw material flowing through the liquid MFC and an influence on a vaporization state of the raw material vaporized by the vaporizer. As a result, the fluctuation in the characteristic of the glass fine particle deposited on the glass fine particle deposited body can be further reduced.

(2) In the raw material supply device for manufacturing the glass fine particle deposited body according to (1), a plurality of the burners may be provided, and one side ends of a plurality of split pipes respectively directed to the plurality of burners may be respectively connected to the other end of the liquid raw material pipe, each of the liquid MFCs may be connected to the other end of each of the plurality of split pipes, a second pressure adjustment valve may be provided on each primary side of the liquid MFC in the plurality of split pipes, and a pipe on a secondary side of the second pressure adjustment value may be connected to a location whose pressure is lower than pressure on a primary side thereof.

When the liquid raw material is divided and flows to each split pipe, the bubbles of the dissolved gas generated by reducing the pressure in the split pipe flows from the high pressure side of the second pressure adjustment valve to the low pressure side (the side of the secondary side pipe) thereof. As a result, the dissolved gas can be removed from the liquid raw material supplied to the liquid MFC. The dissolved gas is removed, thereby making it possible to reduce the flow rate fluctuation in the liquid raw material flowing through the liquid MFC and the influence on the vaporization state of the raw material vaporized by the vaporizer. Therefore, the flow rate fluctuation in the gas sprayed from the burner is reduced, and the fluctuation in the characteristic of the glass fine particle deposited on the glass fine particle deposited body can be further reduced.

(3) A raw material supply method according to one aspect of the present disclosure is a raw material supply method that supplies a raw material to a burner when manufacturing a glass fine particle deposited body, the method including:

pressure-feeding a liquid raw material to a liquid MFC by a liquid raw material pressure feed pump via a liquid raw material pipe whose one end is connected to a liquid raw material tank in which the liquid raw material formed of liquid siloxane is stored;

providing a pressure adjustment valve on a secondary side of the liquid raw material pressure feed pump in the liquid raw material pipe;

connecting a secondary side pipe of the pressure adjustment valve to a location whose pressure is lower than pressure of a primary side thereof.

adjusting primary pressure of the liquid MFC by the liquid raw material pressure feed pump and the pressure adjustment valve; and vaporizing the liquid raw material on a secondary side of the liquid MFC and supplying the vaporized liquid raw material to the burner.

Since an opening degree of the pressure adjustment valve is adjusted according to a change in pressure on a high pressure side (the primary side), pressure fluctuation on the high pressure side (the primary side) is flattened. As a result, pulsation (the pressure fluctuation) of the liquid raw material by the liquid raw material pressure feed pump can be reduced. Therefore, fluctuation in the pressure on the primary side of the liquid MFC is reduced, and fluctuation in a flow rate of the liquid raw material flowing through the liquid MFC is reduced. Therefore, since fluctuation in a flow rate of gas sprayed from the burner is reduced, fluctuation in a characteristic of the glass fine particle deposited on the glass fine particle deposited body can be reduced.

Since bubbles of dissolved gas generated by the liquid raw material pressure feed pump or the like flows from the high pressure side of the pressure adjustment valve to the low pressure side (a side of a secondary side pipe) thereof, the dissolved gas can be removed from the liquid raw material supplied to the liquid MFC. The dissolved gas is removed, thereby making it possible to reduce the fluctuation in the flow rate of the liquid raw material flowing through the liquid MFC and an influence on a vaporization state of the raw material vaporized by the vaporizer. As a result, the fluctuation in the characteristic of the glass fine particle deposited on the glass fine particle deposited body can be further reduced.

Details of Embodiments of the Present Disclosure

A specific example of a raw material supply device for manufacturing a glass fine particle deposited body and a raw material supply method according to an embodiment of the present disclosure will be described with reference to the drawings.

The present invention is not limited to the examples, but is indicated by the scope of the claims, and is intended to include all the modifications within the meaning equivalent to the scope of the claims and within the scope thereof.

FIGURE is a schematic configuration diagram illustrating an example of a raw material supply device according to an embodiment of the present disclosure. The raw material supply device is a device that supplies a raw material for manufacturing a glass fine particle deposited body to a burner for manufacturing a glass fine particle. In the raw material supply device of the embodiment, an example in which the raw material is supplied to a plurality of burners (three burners in the present example) will be described.

As illustrated in FIGURE, a raw material supply device 1 includes a raw material tank 10, a liquid raw material pipe 20, a liquid raw material pressure feed pump 30, a first pressure adjustment valve 40, a liquid MFC 50, a second pressure adjustment valve 60, vaporizer 70.

In the raw material tank 10, liquid raw material 11 which is a liquid glass raw material is stored in a sealed state. The liquid raw material 11 is, for example, siloxane liquid such as octamethylcyclotetrasiloxane (OMCTS), hexamethylcyclotrisiloxane (HMCTS), decamethylcyclopentanesiloxane (DMCPS), or the like. Since OMCTS is the most desirable as siloxane serving as the glass raw material, the embodiment will describe a case, as an example, in which the siloxane liquid of OMCTS is used as the liquid raw material 11.

Gas such as nitrogen or the like is contained in an upper portion of the liquid raw material 11 in the raw material tank 10. With that, pressure P1 in the raw material tank 10 is pressurized to about 0.1 MPa so that dust and outside air do not enter through a gap.

The liquid raw material pipe 20 is a pipe that supplies the liquid raw material 11 from the raw material tank 10 to the liquid mass flow controller (MFC) 50. One end portion of the liquid raw material pipe 20 is connected to the raw material tank 10.

The liquid raw material pressure feed pump 30 is a pump for pressure-feeding the liquid raw material 11 from the raw material tank 10 to the liquid MFC 50 via the liquid raw material pipe 20 and a split pipe 21. The liquid raw material pressure feed pump 30 is provided at a position close to the raw material tank 10 in the liquid raw material pipe 20. The number of strokes of the liquid raw material pressure feed pump 30 is, for example, about 190 times per minute at the maximum. Pressure in the liquid raw material pipe 20 on a secondary side of the liquid raw material pressure feed pump 30 is pressure P2 higher than the pressure P1 in the raw material tank 10. The secondary side indicates a downstream side in a direction in which the glass raw material flows. An upstream side in the direction in which the glass raw material flows with respect to the secondary side will be described hereinafter as a primary side.

A primary side pipe 42 of the first pressure adjustment valve 40 is connected to the liquid raw material pipe 20, and a secondary side pipe 43 thereof is connected to the raw material tank 10. Therefore, primary side pressure of the first pressure adjustment valve 40 becomes the pressure P2, and secondary side pressure of the first pressure adjustment valve 40 becomes the pressure P1 lower than the pressure P2. In the first pressure adjustment valve 40, an opening degree of the valve is adjusted by an opening degree adjustment portion 41 according to a pressure difference (differential pressure) between the pressure on the high pressure side (inside the primary side pipe 42) and the pressure on the low pressure side (inside the secondary side pipe 43).

The other side of the liquid raw material pipe 20 is split into a plurality of systems (three systems in this example) of split pipes 21 at a split point A. Each pressure reducing valve 90 is provided in the split pipe 21 in each system. The pressure reducing valve 90 is an adjustment valve for adjusting pressure in the split pipe 21 in which a pressure difference occurs due to the splitting of the liquid raw material pipe 20 to, for example, predetermined pressure P3. The adjusted pressure P3 is pressure higher than the pressure P1 in the raw material tank 10.

The liquid MFC 50 is a controller for controlling a flow rate of the liquid raw material 11 flowing through the split pipe 21. The liquid MFC 50 sends a controlled predetermined amount of the liquid raw material 11 to the vaporizer 70 via a split pipe 22 (a pipe on a secondary side of the liquid MFC 50).

The second pressure adjustment valve 60 is provided on a primary side of the liquid MFC 50, and is provided on a secondary side of the pressure reducing valve 90 in the split pipe 21. A primary side pipe 62 of the second pressure adjustment valve 60 is connected to the split pipe 21, and a secondary side pipe 63 thereof is connected to the raw material tank 10. Therefore, primary side pressure of the second pressure adjustment valve 60 becomes the pressure P3, and secondary side pressure of the second pressure adjustment valve 60 becomes the pressure P1 lower than the pressure P3. In the second pressure adjustment valve 60, an opening degree of the valve is adjusted by an opening degree adjustment portion 61 according to a pressure difference (differential pressure) between pressure on the high pressure side (inside the primary side pipe 62) and pressure on the low pressure side (inside the secondary side pipe 63).

The vaporizer 70 is connected to the secondary side of the liquid MFC 50. The vaporizer 70 is a device for vaporizing the liquid raw material 11 sent from the liquid MFC 50. For example, the vaporizer 70 generates glass raw material gas by dropping the liquid raw material 11 onto carrier gas sprayed at a high speed. When the liquid raw material 11 is OMCTS siloxane liquid, the OMCTS siloxane liquid is heated to about 175° C. to 200° C.

As the carrier gas, for example, inert gas such as nitrogen gas or the like is used.

The glass raw material gas is supplied to a burner 80 provided in a reaction vessel 2 via a raw material gas supply pipe 23.

Next, a raw material supply method using the raw material supply device 1 will be described.

The liquid raw material pressure feed pump 30 is driven and the liquid raw material 11 in the raw material tank 10 is pressure-fed toward the liquid MFC 50 via the liquid raw material pipe 20. By the pressure-feeding of the liquid raw material pressure feed pump 30, the pressure in the liquid raw material pipe 20 on the secondary side of the liquid raw material pressure feed pump 30 becomes the pressure P2 higher than the pressure P1 in the raw material tank 10. By the pressure-feeding of the liquid raw material pressure feed pump 30, pulsation is generated in the pressure P2 in the liquid raw material pipe 20 on the secondary side of the liquid raw material pressure feed pump 30.

Since the opening degree of the first pressure adjustment valve 40 is adjusted according to a change in the pressure P2 of the primary side pipe 42, pulsation (fluctuation) of the pressure P2 is flattened. As a result, the pulsation generated at the pressure P2 in the liquid raw material pipe 20 is reduced by the first pressure adjustment valve 40 provided in the liquid raw material pipe 20.

A part of the liquid raw material 11 is returned to the raw material tank 10 via the secondary side pipe 43 of the first pressure adjustment valve 40.

The liquid raw material 11 flowing through the liquid raw material pipe 20 is split into three split pipes 21 at the split point A and flows therethrough. A variation occurs between pressures of the three split pipes 21 due to the splitting of the liquid raw material pipe 20. The pressure of each split pipe 21 is adjusted by the pressure reducing valve 90 in order to eliminate the variation in the pressure between the respective split pipes 21.

By performing decompression of the liquid raw material 11, gas dissolved in the liquid raw material 11 may become bubbles and the bubbles may be generated in the split pipe 21.

In the split pipe 21, the second pressure adjustment valve 60 is provided on the primary side of the liquid MFC 50, and is provided on the secondary side of the pressure reducing valve 90. The primary side pipe 62 of the second pressure adjustment valve 60 is connected to the split pipe 21, and the secondary side pipe 63 is connected to the raw material tank 10. As a result, the primary side pressure of the second pressure adjustment valve 60 becomes the pressure P3, and the secondary side pressure of the second pressure adjustment valve 60 becomes the pressure P1 lower than the pressure P3. In the second pressure adjustment valve 60, the opening degree of the valve is adjusted by the opening degree adjustment portion 61 according to the pressure difference (the differential pressure) between the pressure on the primary side (the high pressure side) and the pressure on the secondary side (the low pressure side). As a result, the bubbles generated in the split pipe 21 flows to the side of the secondary side pipe 63 having the low pressure (pressure lower than the pressure P3) by the second pressure adjustment valve 60 provided in the split pipe 21, such that the bubbles can be removed. A part of the liquid raw material 11 also flows to the secondary side of the second pressure adjustment valve 60 together with the bubbles, and the liquid raw material 11 that flows to the secondary side thereof is returned to the raw material tank 10 via the secondary side pipe 63.

The liquid raw material 11 from which the bubbles is removed is sent to the liquid MFC 50. Next, the flow rate of the liquid raw material 11 is controlled by the liquid MFC 50, and a controlled predetermined amount of the liquid raw material 11 is sent to the vaporizer 70. Then, the vaporizer 70 generates glass raw material gas, and the generated glass raw material gas is supplied to the burner 80.

As described above in detail, according to the raw material supply device 1 and the raw material supply method of the embodiment, the first pressure adjustment valve 40 is provided on the secondary side of the liquid raw material pressure feed pump 30, and the secondary side of the first pressure adjustment valve 40 is connected to the raw material tank 10 having the pressure P1 lower than that of the primary side. Since the opening degree of the first pressure adjustment valve 40 is adjusted according to the change in the pressure on the high pressure side (the primary side), the pressure fluctuation on the high pressure side (the primary side) is flattened. As a result, the pulsation (the pressure fluctuation) caused by the liquid raw material pressure feed pump 30 can be reduced. Therefore, the fluctuation in the pressure on the primary side in the liquid MFC 50 is reduced, and flow rate fluctuation in the liquid raw material 11 flowing through the liquid MFC 50 is reduced. As a result, flow rate fluctuation in the glass raw material gas to be vaporized by the vaporizer 70 can be reduced, and the flow rate fluctuation in the glass raw material gas sprayed from the burner 80 is reduced, thereby making it possible to reduce fluctuation in a characteristic of the glass fine particle deposited on the glass fine particle deposited body.

Since the bubbles of the dissolved gas generated by the liquid raw material pressure feed pump 30 or the like flows from the high pressure side of the first pressure adjustment valve 40 to the low pressure side (the side of the secondary side pipe 43) thereof, the dissolved gas can be removed from the liquid raw material 11 supplied to the liquid MFC 50. The dissolved gas is removed, thereby making it possible to reduce the flow rate fluctuation in the liquid raw material 11 flowing through the liquid MFC 50 and an influence on a vaporization state of the glass raw material gas vaporized by the vaporizer 70. As a result, the fluctuation in the characteristic of the glass fine particle deposited on the glass fine particle deposited body can be further reduced.

In the raw material supply device 1 according to embodiment, in the split pipe 21 connected to each burner 80, each second pressure adjustment valve 60 is provided on the primary side of the liquid MFC 50, and the secondary side of the second pressure adjustment valve 60 is connected to the raw material tank 10 having the pressure P1 lower than that of the primary side. When the liquid raw material 11 is divided and flows to each split pipe 21, the bubbles of the dissolved gas generated by reducing the pressure in the split pipe 21 flows from the high pressure side of the second pressure adjustment valve 60 to the low pressure side (the side of the secondary side pipe 63) thereof. As a result, the dissolved gas can be removed from the liquid raw material 11 to be supplied to the liquid MFC 50. The dissolved gas is removed, thereby making it possible to reduce the flow rate fluctuation in the liquid raw material 11 flowing through the liquid MFC 50 and the influence on the vaporization state of the glass raw material gas vaporized by the vaporizer 70. Therefore, the flow rate fluctuation in the gas sprayed from the burner 80 is reduce, and the fluctuation in the characteristic of the glass fine particle deposited on the glass fine particle deposited body can be further reduced.

In the embodiment, as illustrated in FIGURE, the liquid raw material pipe 21 is split into a plurality of systems (three systems in the example of FIGURE) at the split point A, and then the glass raw material gas is supplied to one burner for each system, but the liquid raw material pipe 21 may be formed to be one system up to the liquid MFC 50. Here, the other side of the liquid raw material pipe 20 is connected to the liquid MFC without being split, and the second pressure adjustment valve 60 is provided in the liquid raw material pipe 20 (in this case, the pressure reducing valve 90 may not be provided). Next, the secondary side of the liquid MFC 50 is split into a plurality of systems, and each system is connected to the burner 80 via the vaporizer 70 and the raw material gas supply pipe 23. Alternatively, the secondary side of the liquid MFC 50 may not be split into a plurality of systems, and may be connected to the burner 80 via the vaporizer 70 and the raw material gas supply pipe 23, such that the glass raw material gas may be configured to be supplied to only one burner.

In the embodiment, the secondary side pipe 43 of the first pressure adjustment valve 40 and the secondary side pipe 63 of the second pressure adjustment valve 60 are connected to the raw material tank 10, but the present invention is not limited thereto, and the secondary side pipes 43 and 63 may be connected to a location, the pressure of which is lower than that of the primary side (of the first pressure adjustment valve 40 and the second pressure adjustment valve 60). For example, the secondary side pipes 43 and 63 may be connected to another container to which pressure lower than that of the primary side (atmospheric pressure or the like) is applied, whereby the liquid raw material 11 flowing through the secondary side pipes 43 and 63 may be discharged into the above-described container.

While the present invention has been described above in detail and with reference to specific embodiments, it is apparent to those skilled in the art that various modifications and corrections can be made without departing from the spirit and scope of the present invention. The number, position, shape, or the like of the above-described components are not limited to the embodiments, and can be changed to the number, position, shape, or the like suitable for performing the present invention.

REFERENCE SIGNS LIST

1: raw material supply device
10: raw material tank
11: liquid raw material
20: liquid raw material pipe
21: split pipe
30: liquid raw material pressure feed pump
40: first pressure adjustment valve (pressure adjustment valve)
42, 62: primary side pipe
43, 63: secondary side pipe
50: liquid MFC
60: second pressure adjustment valve
70: vaporizer
80: burner
90: pressure reducing valve

The invention claimed is:

1. A raw material supply device that supplies a raw material for manufacturing a glass particle deposited body to a burner, the device comprising:
    a liquid raw material tank;
    a liquid raw material pipe with one end connected to the liquid raw material tank;
    a liquid raw material pressure feed pump that pressure-feeds a liquid raw material from the liquid raw material tank to a liquid mass flow controller (MFC) via the liquid raw material pipe;
    a pressure adjustment valve that is provided on a secondary side of the liquid raw material pressure feed pump in the liquid raw material pipe;
    the liquid MFC that is provided on the secondary side of the liquid raw material pressure feed pump, and connected to another end of the liquid raw material pipe; and
    a vaporizer that is connected to a secondary side of the liquid MFC, and vaporizes the liquid raw material,
    wherein the liquid raw material is siloxane,
    a pipe on a secondary side of the pressure adjustment valve is connected to a location with a pressure lower than a pressure on a primary side thereof, and
    an opening degree of the pressure adjustment valve is configured to be adjusted according to a change in pressure on the primary side of the pressure adjustment valve.

2. The raw material supply device according to claim 1, further comprising:
    a plurality of burners, and one side of ends of a plurality of split pipes respectively directed to the plurality of burners are respectively connected to the another end of the liquid raw material pipe:
    a plurality of liquid MFCs, and each of the liquid MFCs is connected to another end of each of the plurality of split pipes; and
    a second pressure adjustment valve on each primary side of each of the liquid MFCs in the plurality of split pipes, wherein
    a pipe on a secondary side of each second pressure adjustment valve is connected to a location with a pressure lower than a pressure on a primary side thereof.

3. A raw material supply method that supplies a raw material to a burner when manufacturing a glass fine particle deposited body, the method comprising:
    pressure-feeding a liquid raw material to a liquid mass flow controller (MFC) by a liquid raw material pressure feed pump via a liquid raw material pipe with one end connected to a liquid raw material tank in which the liquid raw material formed of liquid siloxane is stored;
    providing a pressure adjustment valve on a secondary side of the liquid raw material pressure feed pump in the liquid raw material pipe;
    connecting a secondary side pipe of the pressure adjustment valve to a location with a pressure lower than a pressure of a primary side thereof;
    adjusting a primary pressure of the liquid MFC by the liquid raw material pressure feed pump and the pressure adjustment valve; and
    vaporizing the liquid raw material on a secondary side of the liquid MFC and supplying the vaporized liquid raw material to the burner,
    wherein an opening degree of the pressure adjustment valve is adjusted according to a change in the pressure on the primary side of the pressure adjustment valve.

* * * * *